(12) United States Patent
Miyake et al.

(10) Patent No.: US 7,341,275 B2
(45) Date of Patent: Mar. 11, 2008

(54) SEAT WITH A SIDE AIRBAG

(75) Inventors: Atsushi Miyake, Kanagawa (JP); Jun Aoki, Kanagawa (JP); Shinichi Kobayashi, Kanagawa (JP)

(73) Assignee: NHK Spring Co. Ltd., Kanagawa (JP)

( * ) Notice: Subject to any disclaimer, the term of this patent is extended or adjusted under 35 U.S.C. 154(b) by 165 days.

(21) Appl. No.: 11/245,243

(22) Filed: Oct. 7, 2005

(65) Prior Publication Data

US 2006/0131848 A1    Jun. 22, 2006

(30) Foreign Application Priority Data

Oct. 8, 2004    (JP) ............................. 2004-296995

(51) Int. Cl.
*B60R 21/207*    (2006.01)
(52) U.S. Cl. .................................. 280/730.2
(58) Field of Classification Search ............. 280/728.2, 280/730.1, 730.2; 297/216.1, 216.13
See application file for complete search history.

(56) References Cited

U.S. PATENT DOCUMENTS

| | | | |
|---|---|---|---|
| 5,498,030 A | * | 3/1996 | Hill et al. ................. 280/743.1 |
| 5,651,582 A | * | 7/1997 | Nakano .................. 297/216.13 |
| 5,762,363 A | * | 6/1998 | Brown et al. ............. 280/730.2 |
| 5,893,579 A | * | 4/1999 | Kimura et al. ........... 280/730.2 |
| 5,967,546 A | * | 10/1999 | Homier et al. ........... 280/730.2 |
| 6,045,151 A | | 4/2000 | Wu |
| 6,095,602 A | * | 8/2000 | Umezawa et al. ........ 297/216.1 |
| 6,352,304 B1 | * | 3/2002 | Sorgenfrei ............. 297/216.13 |
| 6,450,528 B1 | * | 9/2002 | Suezawa et al. .......... 280/730.2 |
| 6,578,911 B2 | * | 6/2003 | Harada et al. ......... 297/216.13 |
| 2007/0145727 A1 | * | 6/2007 | Inoue et al. ............. 280/730.2 |

FOREIGN PATENT DOCUMENTS

| | | |
|---|---|---|
| JP | 8-258660 | 10/1996 |
| JP | 10-181503 | 7/1998 |

* cited by examiner

*Primary Examiner*—Paul N. Dickson
*Assistant Examiner*—Joseph Rocca
(74) *Attorney, Agent, or Firm*—Jean C. Edwards, Esq.; Akerman Senterfitt

(57) ABSTRACT

A seat 10 with a side airbag has front and side reinforcement fabrics 21a and 21b covering a front and a side of an airbag unit 22, respectively. These reinforcement fabrics are joined to each other so as to be deployed at an inflating position of an airbag 20 by virtue of an inflating force. The front reinforcement fabric 21a and a front skin 13a are joined to each other so as not to be broken at the inflating position P by virtue of the inflating force. A side skin 13b is provided on an outside of a shape retaining member 23 that is provided on an outside of the side reinforcement fabric 21b, and the side reinforcement fabric 21a and the side skin 13b are joined to each other so as not to be broken at the inflating position P by virtue of the inflating force.

7 Claims, 8 Drawing Sheets

SEAT WITH A SIDE AIRBAG

The present invention claims foreign priority to Japanese patent application No. P.2004-296995, filed on Oct. 8, 2004, the contents of which is incorporated herein by reference.

BACKGROUND OF THE INVENTION

1. Field of the Invention

The present invention relates to a seat with a side airbag and more particularly to a seat with a side airbag which is adapted to be interposed between a vehicle body and an occupant on the seat so as to absorb an impact which is applied at the time of a side impact.

2. Description of the Background Art

Conventionally, there are known seats with a side airbag which is adapted to be interposed between a vehicle body and an occupant on the seat so as to absorb an impact at the time of a side impact (for example, refer to Japanese Patent Unexamined Publications Nos. JP-A-8-258660 and JP-A-10-181503 and United State Examined Publication No. U.S. Pat. No. 6,045,151).

For example, in a seat with a side airbag that is disclosed in the JP-A-8-258660, an airbag unit is disposed at a side of the seat, a pad member is provided in front of and on an outside of a side of the airbag unit, and the pad member so provided is covered with a skin. Consequently, when inflating, the airbag inflates by push opening the pad member in front and the pad member on the outside of the side thereof.

In addition, in a seat with a side airbag disclosed in the JP-A-10-181503, an airbag unit is disposed at a side of a seat, the airbag unit is covered with a reinforcement fabric, and the outside of the reinforcement fabric is covered with a skin.

FIG. 8 shows a seat with a side airbag that is disclosed in the U.S. Pat. No. 6,045,151. As shown in FIG. 8, a side frame 102 is mounted on a side of a seat frame 101, and an airbag unit 103 is mounted on this side frame 102. The airbag unit 103 has an inflator 104 which injects an inflating gas and an airbag 106 which is inflated by the gas injected from the inflator 104 in such a manner as to project forwards of a seat 105. A hard housing 110 is provided back of the airbag unit 103, a reinforcement fabric 107 covers the airbag unit 103 from the back of the housing 110, and the reinforcement fabric 107 is made to be opened in a direction in which the airbag 106 is inflated. In addition, a pad member 108 is provided on an outside of the reinforcement fabric 107, and an outside of the pad member 108 is covered with a skin 109.

Incidentally, in the seat with a side airbag disclosed in the JP-A-8-258660, since the pad member is provided on the outside of the airbag unit and an impact of inflation of the airbag that is caused when the airbag inflates momentarily is absorbed, there are caused drawbacks that the response is deteriorated and that the inflating direction of the airbag becomes unstable.

In addition, in the seat with a side airbag disclosed in the JP-A-10-181503, while the reinforcement fabric is used in order to increase the response of the deployment of the airbag and to stabilize the inflating direction of the airbag. However, since no pad member is provided on a side of the seat, it is difficult to retain the side of the seat in a desired shaped.

Furthermore, in the seat with a side airbag disclosed in the U.S. Pat. No. 6,045,151, since the pad member 108 is provided on the outside of the reinforcement fabric 107 and the impact of the airbag 106 is absorbed when the airbag 106 inflates, there is causes a drawback that the response is deteriorated.

To cope with this, there are proposed seats with a side airbag in which a hard cover is used from the viewpoint of response and shape retention, and in this case, the whole of the seat with a side airbag is enlarged and hence the degree of freedom in design is reduced, and there is caused a risk that the airbag may be caught on the hard cover when it inflates.

SUMMARY OF THE INVENTION

In order to overcome the above described problems, an object of the invention is to provide a seat with a side airbag which can increase the inflation response of an airbag and stabilize the inflating direction so as to improve the occupant protection performance and which can increase the degree of freedom in design.

According to a first aspect of the present invention, there is provided a seat with a side airbag comprising:

a seat having:

a seat back frame;

front and back pad members provided on front and back side of the seat back frame, respectively;

front and back skins covering the front and back pad members, respectively; and a side frame mounted on a side of the seat back frame;

an airbag unit as a side airbag mounted on an outside of the side frame and having an airbag in an interior thereof, the airbag being adapted to inflate forwards so as to be interposed between a vehicle body and an occupant on the seat to thereby absorb an impact at the time of a side impact;

a front reinforcement fabric covering a front of the air bag unit, the front reinforcement fabric provided such that the front pad member and the front skin are provided in front of the front reinforcement fabric;

a side reinforcement fabric covering a side of the air bag unit; and a shape retaining member retaining a side shape of the seat, and a side skin both of which are provided on an outside of the side reinforcement fabric, wherein the front reinforcement fabric and the side reinforcement fabric are joined to each other in such a manner as to be deployed at an inflating position of the airbag by virtue of an inflating force of the airbag.

In the seat with a side airbag that is configured as has been described above, since there are provided the front reinforcement fabric which covers the front of the airbag unit and the side reinforcement fabric which covers the side of the airbag unit and both of the front and side reinforcement fabrics are joined to each other in such a manner as to be deployed at the inflating position, the airbag is allowed to inflate from the joining portion when it inflates. Due to this structure, the inflating performance of the airbag is determined only by the reinforcement fabrics, the response of the airbag to a stimulus to inflation can be enhanced and the inflating direction can be stabilized. In addition, since the pad member is provided on the front side of the front reinforcement fabric and the pad member is covered with the skin, the cushioning characteristic can be retained. On the other hand, since the shape retaining member is provided on the outside (the side) of the side reinforcement fabric and the shape retaining member is covered with the skin, the saving of space can be realized and the side of the seat can be retained in a desired shape, thereby making it possible to enhance the design characteristic of the seat.

According to a second aspect of the present invention, as set forth in the first aspect of the present invention, it is preferable that a front end edge of the shape retaining member overlaps an external side of the pad member.

According to a third aspect of the present invention, as set forth in the first aspect of the present invention, it is preferable that the front reinforcement fabric and the front skin are joined to each other in such a manner as not to be broken at the inflating position by virtue of the inflating force of the airbag, the side reinforcement fabric and the side skin are joined to each other in such a manner as not to be broken at the inflating position by virtue of the inflating force of the airbag, and the front reinforcement fabric and the side reinforcement fabric are joined to each other in such a manner as to be deployed by virtue of the inflating force of the airbag due to the front skin and the side skin being joined to each other in such a manner as to be broken at the inflating position.

According to a fourth aspect of the present invention, as set forth in the first aspect of the present invention, it is preferable that the front skin and the side skin are joined to each other together with the front and side reinforcement fabrics in such a manner as to be broken at the inflating position by virtue of the inflating force of the airbag.

According to the invention, the response of the airbag to a stimulus to inflation can be enhanced and the inflating direction can be stabilized. Furthermore, the saving of space can be realized and the side of the seat can be retained in a desired shape, thereby making it possible to enhance the design characteristic of the seat.

DETAILED DESCRIPTION OF THE PREFERRED EMBODIMENTS

Figure 1:
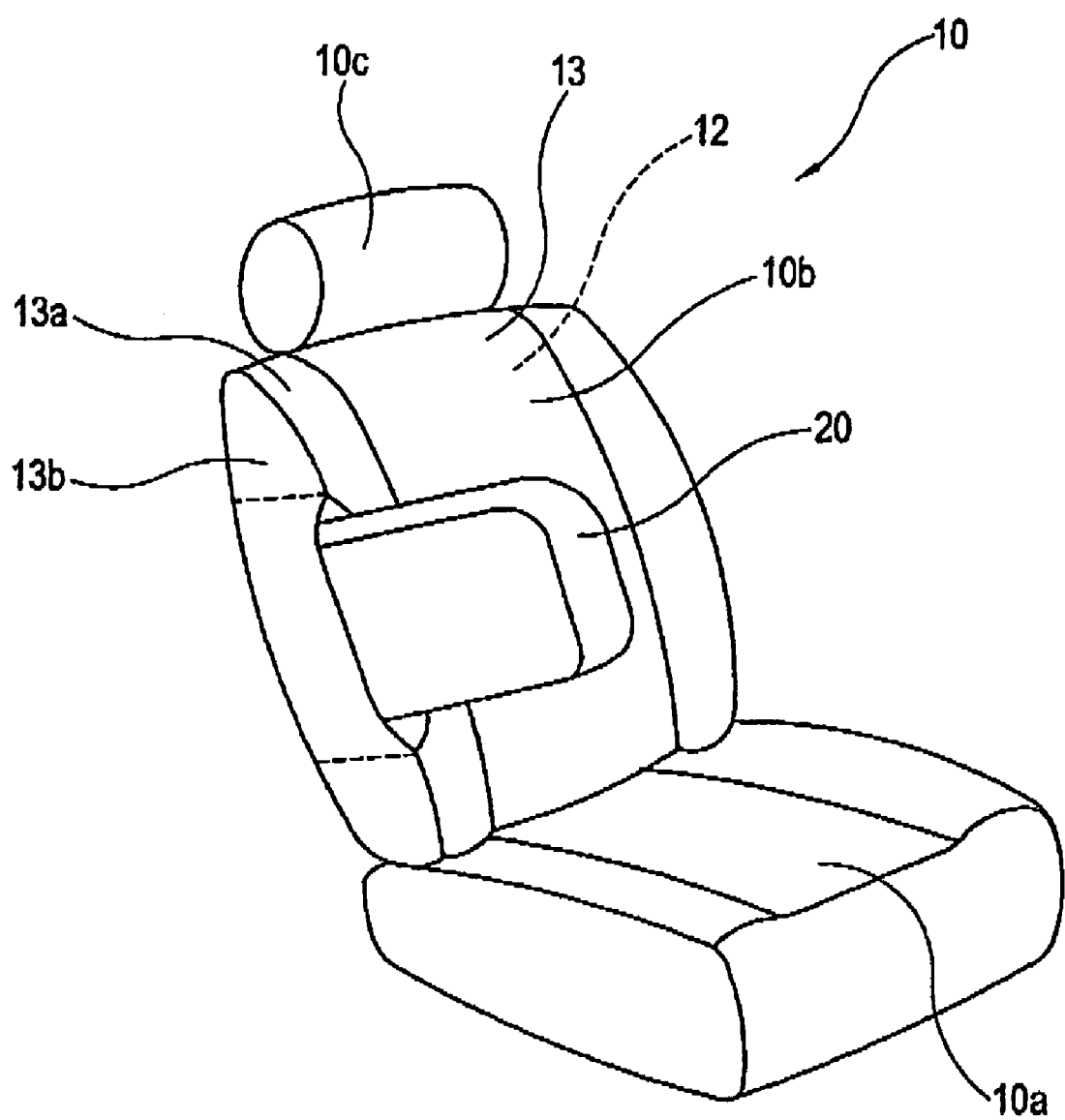
FIG. 1 is a perspective view of a seat with a side airbag according to an embodiment of the invention.
Figure 2:
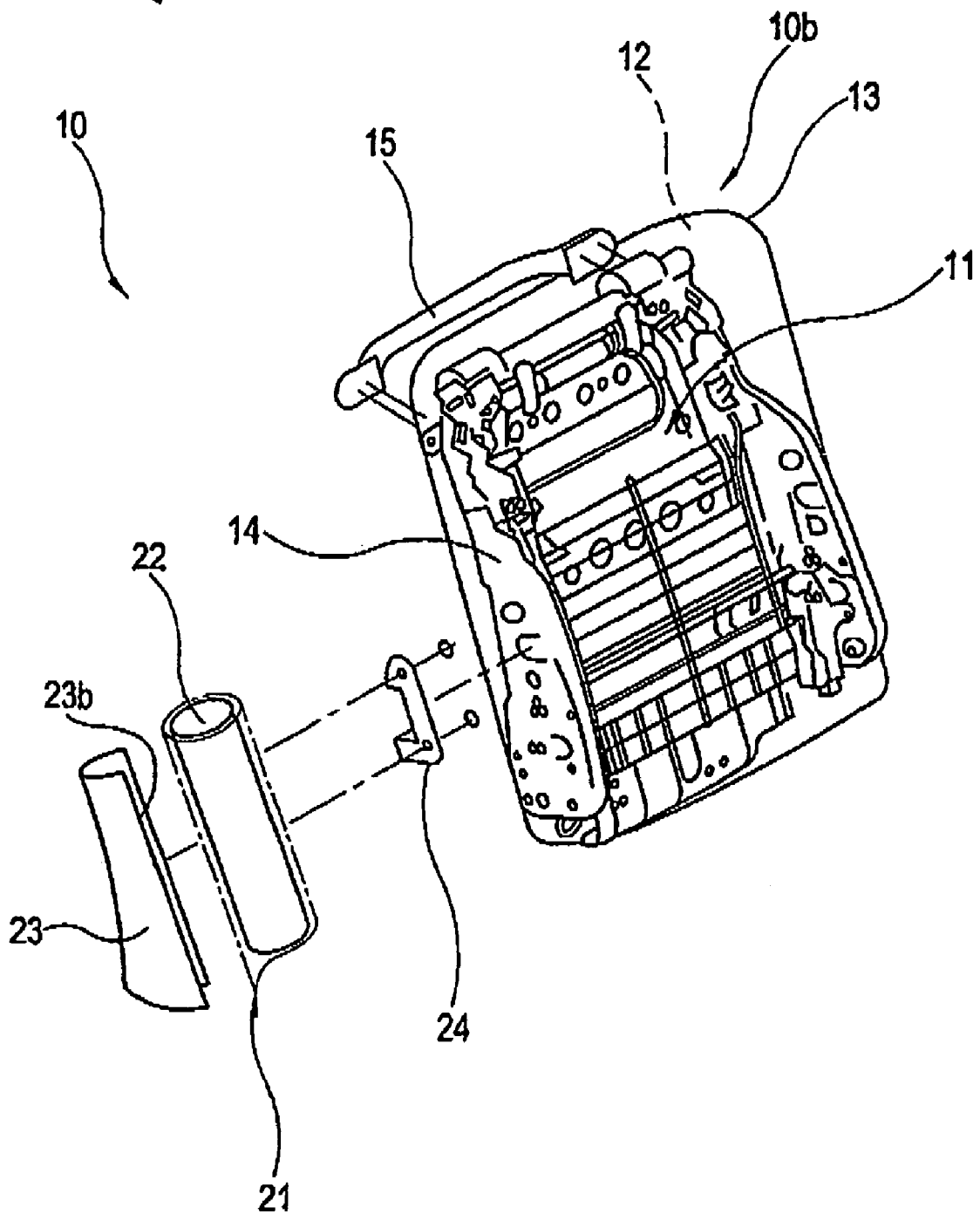
FIG. 2 is an exploded perspective view of a seat back of the seat with a side airbag as viewed obliquely from the front.
Figure 3:
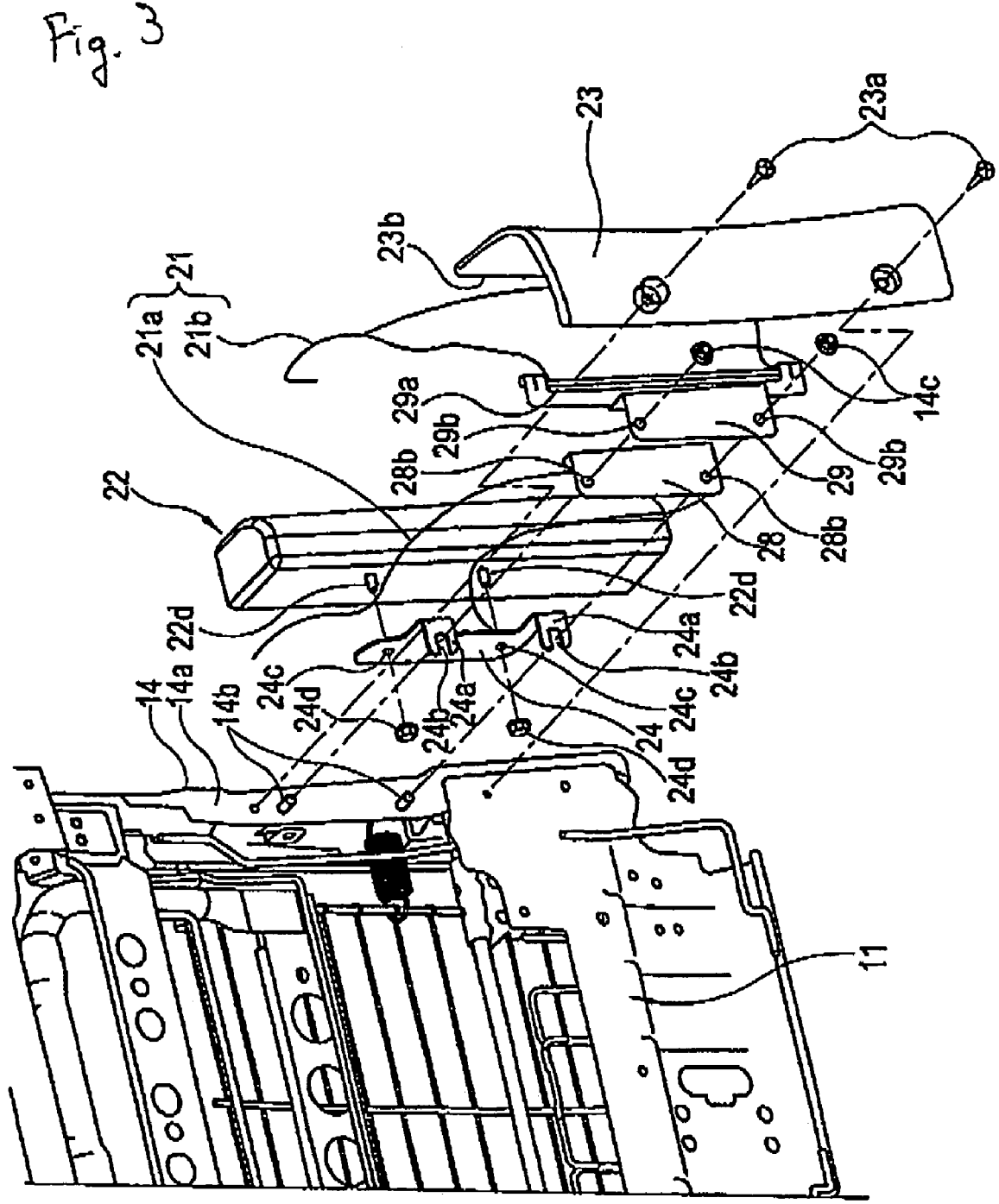
FIG. 3 is an exploded perspective view of a main part of the seat back of the seat with a side airbag as viewed obliquely from the rear.
Figure 4:
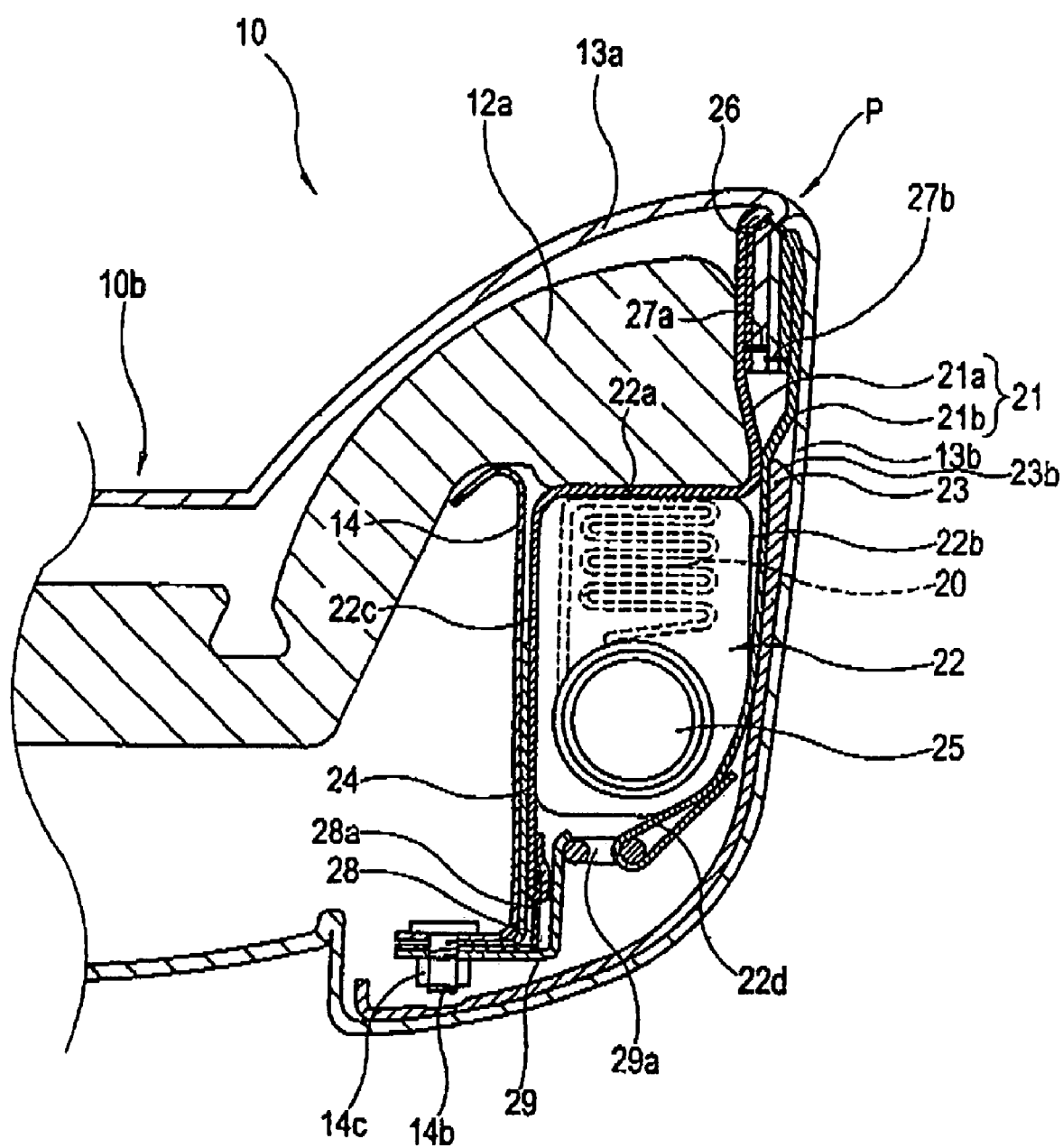
FIG. 4 is a sectional view of the main part which shows a state in which a side airbag is mounted.
Figure 5:
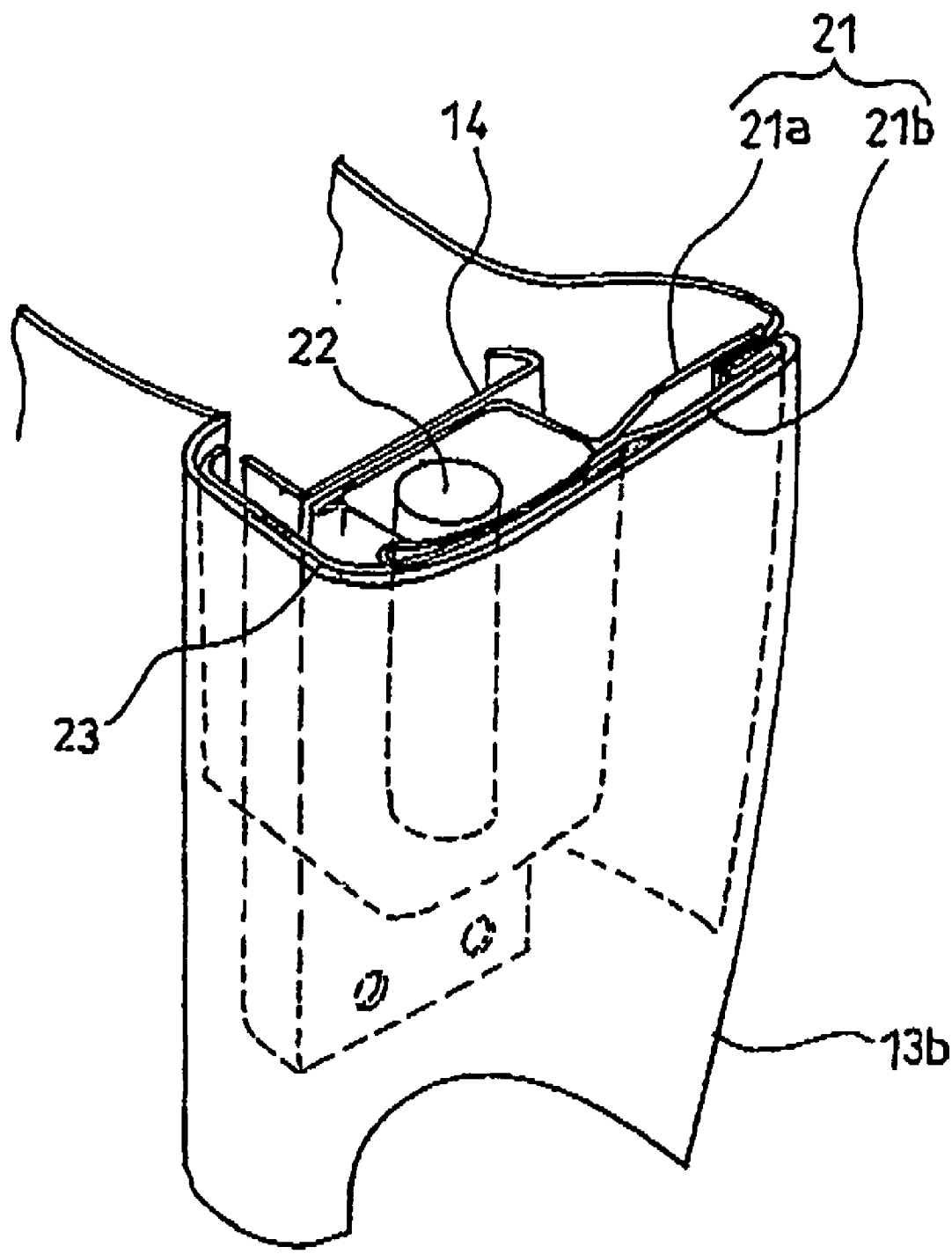
FIG. 5 is a schematic perspective view of the main part.

An embodiment of a seat with a side airbag according to the invention will be described in detail below by reference to the drawings. FIG. 1 is a perspective view of a seat with a side airbag according to an embodiment of the invention, FIG. 2 is an exploded perspective view of a seat back of the seat with a side airbag as viewed obliquely from the front, FIG. 3 is an exploded perspective view of a main part of the seat back of the seat with a side airbag as viewed obliquely from the rear, FIG. 4 is a sectional view of the main part which shows a state in which a side airbag is mounted, and FIG. 5 is a schematic perspective view of the main part.

As shown in FIGS. 1 to 5, a seat 10 with a side airbag of the embodiment has a seat back frame 11, a skin 13 which covers a pad member 12 provided on front and back sides of the seat back frame 11 and side frames 14 which are mounted on sides of the seat back frame 11. Then, the seat 10 includes an airbag unit 22 that is mounted on an outside of the side frame 14, which has an airbag 20 in an interior thereof and whose outside is covered with a reinforcement fabric 21, and at the time of a side impact, the airbag 20 is adapted to inflate forwards so as to be interposed between a vehicle body and an occupant on the seat to thereby absorb an impact that would otherwise be applied to the occupant. The reinforcement fabric 21 is made up of a front reinforcement fabric 21a which covers a front 22a of the airbag unit 22 and a side reinforcement fabric 22b which covers a side 22b of the airbag unit 22. The front reinforcement fabric 21a and the side reinforcement fabric 21b are joined to each other in such a manner that a front skin 13a and a side skin 13b are stitched together at the inflating position P with an appropriate strength, in which the joining is broken at the inflating position P when the inflating force of the airbag 20 is applied thereto. Thus, the front reinforcement fabric 21a and the side reinforcement fabric 21b are joined to each other with being capable of deploying at the inflating position P. A pad member 12a and a front skin 13a are provided in front of the front reinforcement fabric 21a, and a shape retaining member 23 which retains the side shape of the seat 10 is provided on an outside of the side reinforcement fabric 21b, and a side skin 13b is provided on an outside of the shape retaining member 23.

While the skin 13 is made of a material that is elongated relatively easily from the viewpoint of improving the seating comfort of the seat 10, on the other hands, the reinforcement fabric 21 is made of a material that is relatively difficult to be elongated compared with the skin 13 so as to transmit the inflating force of the airbag 20 to an inflating position P without absorbing the same force. In addition, the shape retaining member 23 is formed of a hard plastic.

In addition, as shown in FIG. 1, the seat 10 is a front right-hand side seat and has a seat cushion 10a in which an occupant is seated, a seat back 10b which supports the back of the occupant and a head restraint 10c which supports the head of the occupant.

As shown in FIGS. 2 to 5, the seat back frame 11 is provided in the interior of the seat back 10b, and front and back sides of the seat back frame 11 are covered with, for example, a pad member 12 of urethane, and furthermore, an outside of the pad member 12 is covered with the skin 13. A handle 15 for a rear seat occupant is mounted on the back side of the seat back frame 11. In addition, the side frames 14 are integrally provided on the sides of the seat back frame 11.

As shown in FIGS. 2 and 3, the airbag unit 22 is designed to be mounted on an outside of the side frame 14 via an airbag bracket 24.

As shown in FIG. 3, the airbag bracket 24 is formed substantially into a C-shape on the whole, and has upper and lower arms 24a, 24a each of which has a notch 24b at a distal end thereof, and the distal end of each arm 24a is bent substantially at right angles. The airbag bracket 24 is designed to be fixed by fitting the notches 24a at the distal ends of the arms 24a on screws 14b provided on a back side 14a of the side frame 14 and fastening nuts on to the screws 14b.

As shown in FIG. 4, the airbag unit 22 has incorporated therein the airbag 20 which is in a folded state and an inflator 25 which produces a gas used to inflate and deploy the airbag 20, whereby the airbag 20 is allowed to be inflated outwards of the seat back 10b from the inflating position P that is provided at an end portion of the seat back 10b.

As shown in FIG. 4, an internal side 22c and a front 22 of the airbag unit 22 are covered by the front reinforcement fabric 21a, and an external side 22a and a back 22d of the airbag unit 22 are covered by the side reinforcement fabric 21b. The pad member 12a and the front skin 13a are provided in front of the front reinforcement fabric 21a, and in order to retain the side shape of the seat 10, for example, the plastic shape retaining member 23 is provided on the outside of the side reinforcement fabric 21b, and furthermore, the side skin 13b is provided on the outside of the shape retaining member 23. The front skin 13a and the side skin 13b are stitched together with a thin stitching thread 26 in such a manner that the front reinforcement fabric 21a and the side reinforcement fabric 21b can be deployed at the inflating position P by virtue of the inflating force of the airbag 20, when the airbag 20 is inflated. In addition, a distal end of the front reinforcement fabric 21a is stitched firmly to a distal end of the front skin 13a with a thick thread 27a so that the front reinforcement fabric 21a and the front skin 13a, which are so stitched together, are not broken to be separated even by the inflating force of the airbag 20. Similarly, a distal end of the side reinforcement fabric 21b is stitched firmly to a distal end of the side skin 13b with a thick thread 27b so that the side reinforcement fabric 21b and the side skin 13b which are so stitched together are not broken to be separated even by the inflating force of the airbag 20.

Based on FIGS. 3 and 4, a mounting method of the airbag unit 22 will be described.

Firstly, an end portion of the front reinforcement fabric 21a is, in advance, passed through a vertically elongated notch 28a provided in a front reinforcement fabric bracket 28 which is formed into a shape having an L-shaped cross section so as to be mounted on the same bracket thereat, and an end portion of the side reinforcement fabric 21b is, in advance, passed through a vertically elongated notch 29a provided in a side reinforcement fabric bracket 29 so as to be mounted on the same bracket thereat. Screws 22d provided on the airbag unit 22 are passed through screw holes 24c provided in the airbag bracket 24 in such a manner as to hold a portion of the front reinforcement fabric 21a which is in the vicinity of the end portion thereof between the airbag unit 22 and the airbag bracket 24, and then, the airbag unit 22 is fixed to the airbag bracket 24 with nuts 24d.

The notches 24b of the airbag bracket 24 are fitted on the screws 14b of the side frame 14, the front reinforcement fabric bracket 28 and the side reinforcement fabric bracket 29 are superposed on the airbag bracket 24 from thereabove (the rear thereof), the screws 14b of the side frame 14 are passed through screw holes 28b, 29b, and the front reinforcement fabric bracket 28 and the side reinforcement fabric bracket 29 are fixed to the side frame 14 altogether with nuts 14c, 14c. Furthermore, the shape retaining member 23 is superposed on the side reinforcement fabric 21b from thereabove (the rear thereof), and the shape retaining member 23 is then fixed to the side frame 14 with screws 23a.

Then, the outside of the shape retaining member 23 is covered with the side skin 13b, the pad member 12a is provided on the front side of the front reinforcement fabric 21a, and the outside of the pad member 12a is covered with the front skin 13a.

Since a front end edge 23b of the shape retaining member 23 is made to overlap the external side of the pad member 12, the external appearance of the side of the seat can be enhanced.

In the seat with a side airbag that is configured as has been described heretofore, when the airbag 20 is inflated, the thin thread 26 which stitches together the front skin 13a and the side skin 13b are broken, whereby the airbag 20 is inflated outwards from the inflating position P which is situated between both the skins 13a, 13b. Note that, as this occurs, since the thick thread 27a which stitches together the distal end of the front reinforcement fabric 21a and the distal end of the front skin 13a and the thick thread 27b which stitches together the distal end of the side reinforcement fabric 21b and the distal end of the side skin 13b are not broken, the front reinforcement fabric 21a and the side reinforcement fabric 21b are deployed at the inflating position P by virtue of the inflating force of the airbag 20, and the inflating direction of the airbag 20 is determined to a predetermined direction by both of the front and side reinforcement fabrics 21a, 21b. In addition, since both of the front and side reinforcement fabrics 21a, 21b are rigidly mounted at the rear of the airbag unit 22, the response of the airbag 20 to a stimulus to inflation can be enhanced and the responding performance of the airbag 20 is determined by the reinforcement fabric 21, thereby making it possible to hold the general-purpose properties of an airbag construction.

In addition, since the shape retaining member 23 is provided on the side of the seat 10 and the shape retaining member 23 is covered with the side skin 13b, the saving of space can be realized and the side of the seat 10 can be formed into a desired shape, thereby making it possible to enhance the degree of freedom in design.

Note that the seat with a side airbag according to the invention is not limited to the embodiment that has been described heretofore, but appropriate modifications and improvements can be made thereto.

Figure 6:
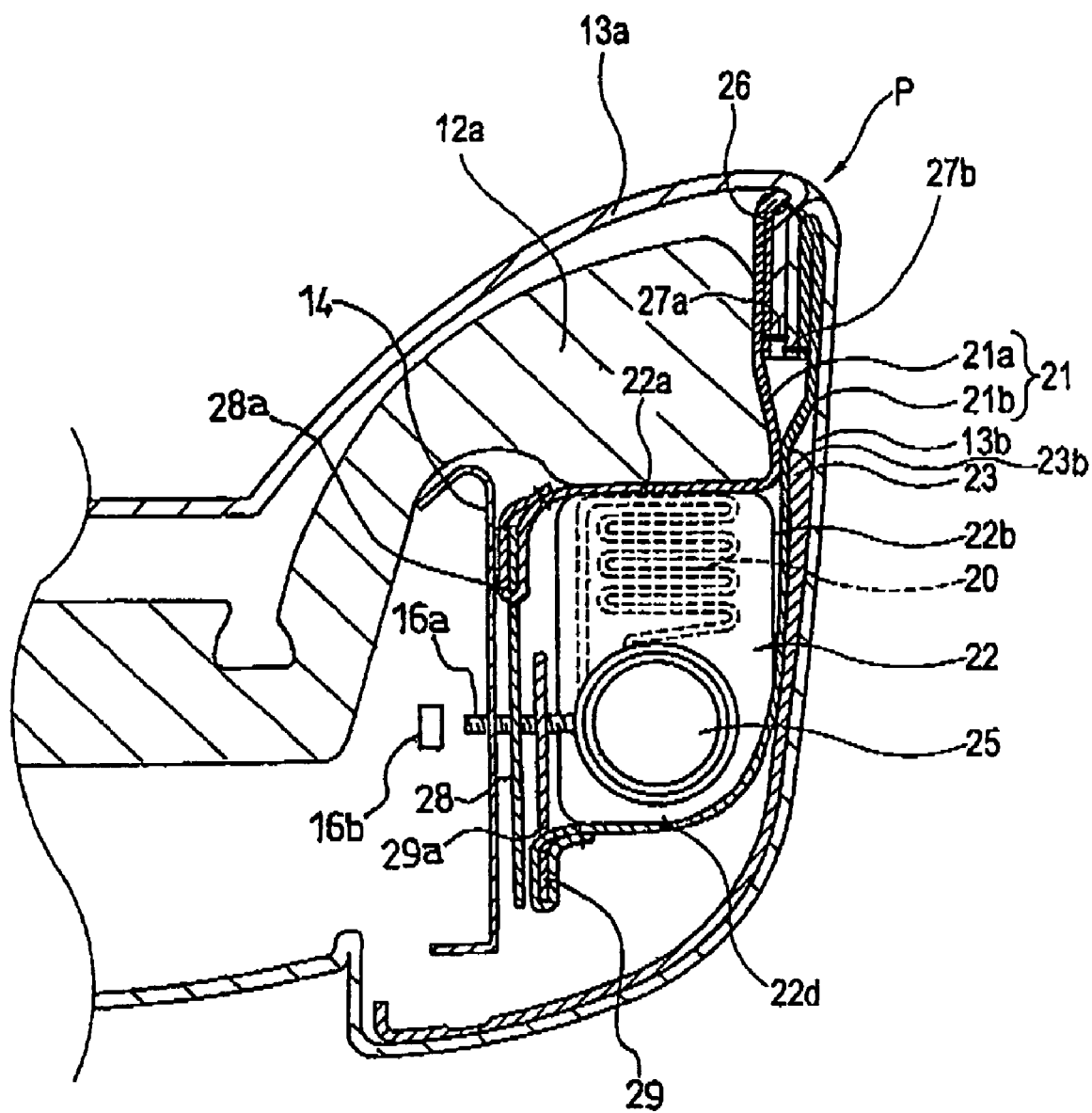
FIG. 6 is a schematic sectional view which shows another method for mounting the reinforcement fabric.
Figure 7:
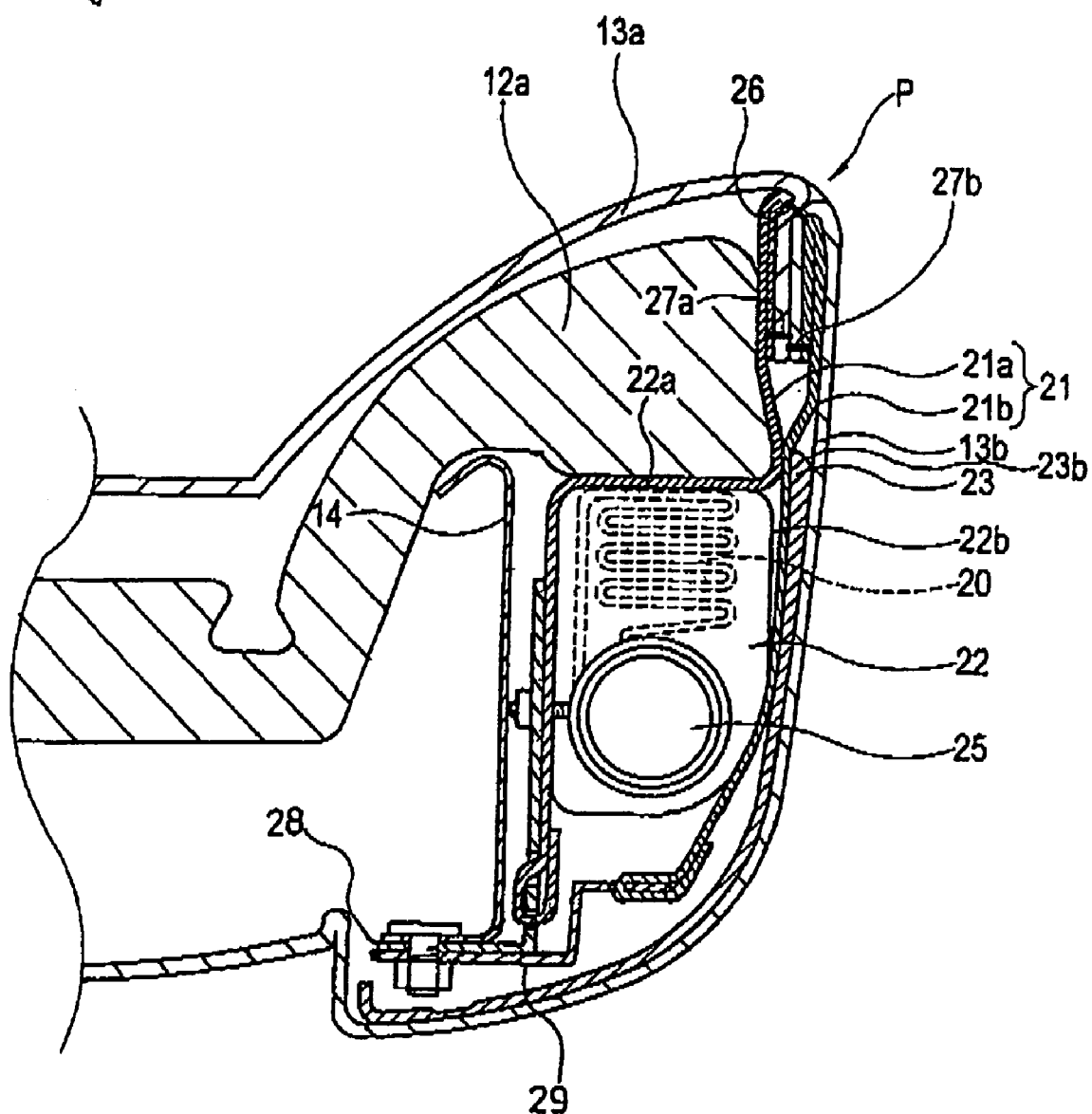
FIG. 7 is a schematic sectional view which shows a further method for mounting the reinforcement fabric.
Figure 8:
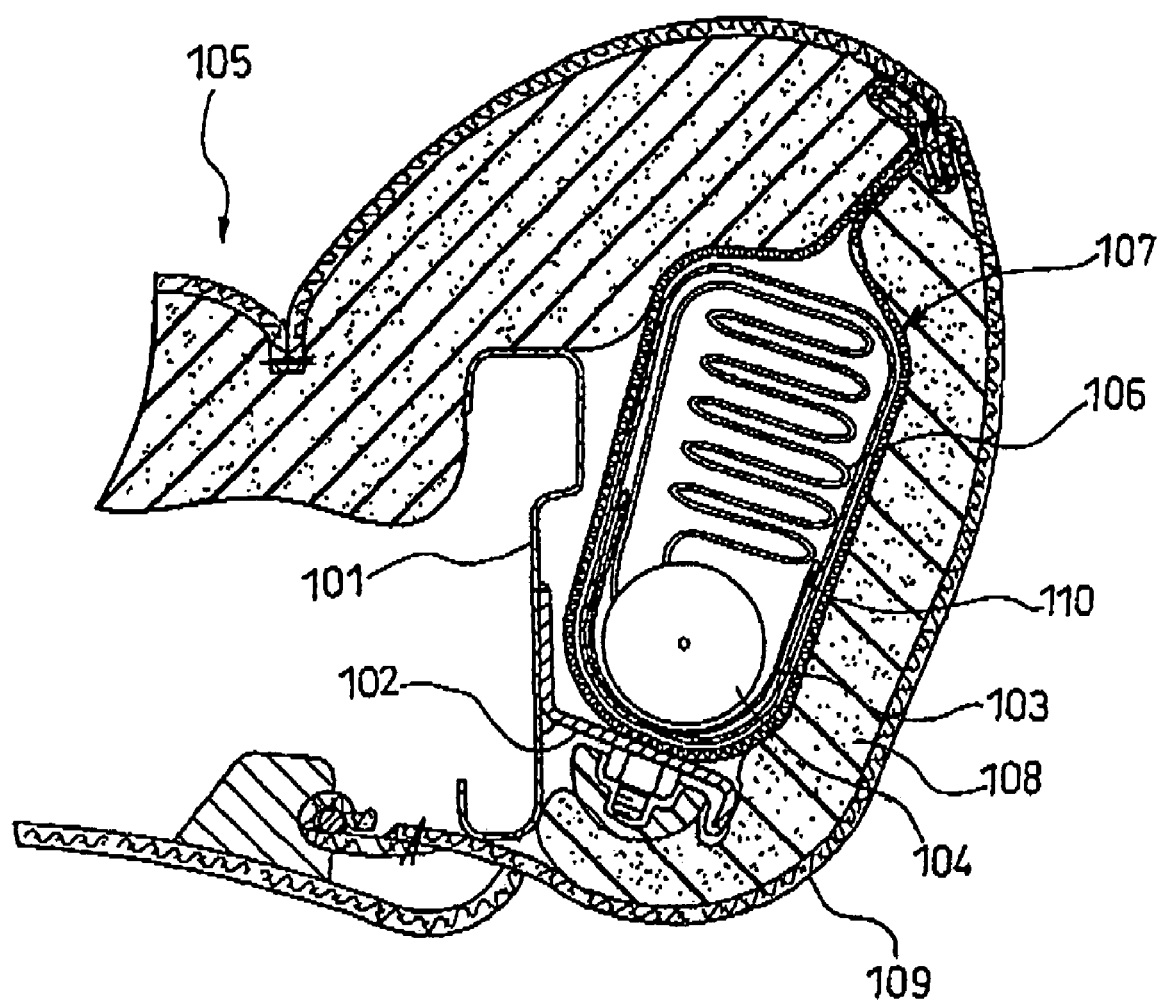
FIG. 8 is a sectional view of a main part of a related art seat with a side airbag.

For example, while in the aforesaid embodiment, the brackets 28, 29 for the reinforcement fabric 21 are provided separately from the airbag bracket 24, the airbag bracket 24 can be made to double as the side reinforcement fabric bracket 28, as shown in FIGS. 6 and 7.

In this case, as shown in FIG. 6, the airbag unit 22 can be mounted directly on the side frame 14 with a bolt 16a and a nut 16b. Alternatively, as shown in FIG. 7, the airbag unit 22 is mounted on the front reinforcement fabric bracket 28, so that the airbag unit 22 can be mounted on the side frame 14 via the front reinforcement fabric bracket 28.

In addition, in the aforesaid embodiment, the front reinforcement fabric 21a and the side skin 13a are stitched together with the thick thread 27a in such a manner as not to be broken at the inflating position by virtue of the inflating force of the airbag 20, while the side reinforcement fabric 21b and the side skin 13b are stitched together with the thick thread 27b in such a manner as not to be broken at the inflating position P by virtue of the inflating force of the airbag 20, and the front skin 13a and the side skin 13b are stitched together with the thin thread 26, whereby the front reinforcement fabric 21a and the side reinforcement fabric 21b are made to be deployed at the inflating position P by virtue of the inflating force of the airbag 20 when it is inflated.

In contrast to this, it is possible to adopt a configuration in which the front skin 13a and the side skin 13b are stitched together with the thin thread 26 in such a manner as to be broken together with the front reinforcement fabric 21a and the side reinforcement fabric 21b at the inflating position P by virtue of the inflating force of the airbag 20, whereby the front reinforcement fabric 21a and the side reinforcement fabric 21b are made to be deployed at the inflating position P by virtue of the inflating force of the airbag 20 when it is inflated.

Thus, as has been described heretofore, the seat with a side airbag according to the invention has advantages that the response of the airbag to a stimulus to inflation can be enhanced and the inflating direction can be stabilized, as well as the saving of space can be realized and the side of the seat can be retained in a desired shape, thereby making it possible to enhance the design characteristic of the seat, and is useful as a seat with a side airbag in which a side airbag is made to be interposed between the vehicle body and the occupant on the seat so as to absorb an impact that would otherwise be applied to the occupant when the vehicle is involved in a side collision.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A seat with a side airbag comprising:
    a seat back having:
        a seat back frame provided in an interior portion of the seat back;
        a side frame mounted on a side of the seat back frame;
        an airbag unit that is coupled to the side frame, the airbag unit comprising:
            an interior wall that is located proximate to the side frame;
            an exterior wall;
            a front wall that is oriented toward a front portion of the seat back;
            a back wall; and
            an airbag that is provided in an interior of the airbag unit, the airbag being adapted to inflate in a forward direction of a vehicle so as to extend between a vehicle body and an occupant positioned on the seat;
        a front pad member provided to cushion the seat back frame and the front wall of the airbag unit;
        a front seat skin provided to cover the front pad member;
        a front reinforcement fabric provided in the interior portion of the seat back, the front reinforcing fabric comprising:
            a first end that is secured proximate to the back wall of the airbag unit;
            a central portion that is adapted to pass along the interior wall of the air bag unit, the front wall of the air bag unit, and the front pad member; and
            a second end that is secured to an edge of the front seat skin at a location proximate to the front pad member;
        a retaining member that forms a side portion of the seat back at a location proximate to the airbag unit;
        a side seat skin provided to cover the non-padded shape retaining member;
        a side reinforcement fabric provided in the interior portion of the seat back, the side reinforcing fabric comprising:
            a distal end that is secured proximate to the back wall of the airbag unit;
            a middle portion that is adapted to pass along the back wall of the air bag unit, the exterior wall of the air bag unit, and along part of the central portion of the front reinforcing fabric; and
            a near end that is secured to an edge of the side seat skin, and
        a securing device that couples together the front seat skin and the side seat skin to form an airbag exit seam on the seat back, wherein the front seat skin provided between the securing device and the edge of the front seat skin contacts the side seat skin provided between the securing device and the edge of the side seat skin, and
        wherein the front reinforcement fabric and the side reinforcement fabric are joined to each other in such a manner as to be deployed at an inflating position of the airbag by an inflating force of the airbag.

2. The seat with the side airbag as set forth in claim 1, wherein an edge of the retaining member overlaps an external facing side of the front pad member.

3. The seat with the side airbag as set forth in claim 1, wherein the second end of the front reinforcement fabric and the edge of the front seat skin are adapted not to separate due to the inflating force of the airbag,
    the near end of the side reinforcement fabric and the edge of the side seat skin are adapted not to separate due to the inflating force of the airbag, and
    wherein the securing device includes stitching that couples the front seat skin and the side seat skin to form the airbag exit seam on the seat back, wherein the stitching is adapted to break due to the inflating force of the airbag.

4. The seat with the side airbag as set forth in claim 1, wherein the securing devices couples the front seat skin and the side seat skin to each other, together with the front and side reinforcement fabrics, at the airbag exit seam and is adapted to break due to the inflating force of the airbag.

5. The seat with the side airbag as set forth in claim 1, further comprising:
    a back pad member provided on a back side of the seat back frame; and
    a back seat skin that covers the back pad member.

6. The seat with the side airbag as set forth in claim 1, wherein the shape retaining member is formed of a hard plastic.

7. The seat with the side airbag as set forth in claim 1, wherein the reinforcement fabric is made of a material that is relatively non-elongatable compared with the side seat skin.

* * * * *